(12) United States Patent
Ishizuka et al.

(10) Patent No.: US 7,677,092 B2
(45) Date of Patent: Mar. 16, 2010

(54) CYLINDER CHARACTERISTIC VARIATION SENSING DEVICE

(75) Inventors: Koji Ishizuka, Chita-gun (JP); Kenichiro Nakata, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/258,750

(22) Filed: Oct. 27, 2008

(65) Prior Publication Data

US 2009/0107225 A1    Apr. 30, 2009

(30) Foreign Application Priority Data

Oct. 26, 2007  (JP)  ............... 2007-279638

(51) Int. Cl.
*G01M 15/04* (2006.01)
(52) U.S. Cl. .................................. 73/114.45
(58) Field of Classification Search ............. 73/114.45, 73/114.48, 114.77
See application file for complete search history.

(56) References Cited

U.S. PATENT DOCUMENTS

| 6,752,126 | B2* | 6/2004 | Pfaeffle et al. | 123/436 |
|---|---|---|---|---|
| 7,395,148 | B2* | 7/2008 | Haraguchi et al. | 701/104 |
| 7,451,037 | B2* | 11/2008 | Ikeda | 701/103 |
| 7,480,557 | B2* | 1/2009 | Yamaguchi et al. | 701/104 |
| 7,500,465 | B2* | 3/2009 | Pfaeffle et al. | 123/299 |
| 7,588,515 | B2* | 9/2009 | Miyazaki | 477/111 |
| 7,600,504 | B2* | 10/2009 | Gangi et al. | 123/486 |
| 2009/0107227 | A1* | 4/2009 | Ishizuka et al. | 73/114.74 |

FOREIGN PATENT DOCUMENTS

JP    2001-355500    12/2001

OTHER PUBLICATIONS

U.S. Appl. No. 11/930,668, Koji Ishizuka et al., filed Oct. 31, 2007.
U.S. Appl. No. 12/179,235, Koji Ishizuka et al., filed Jul. 24, 2008.
U.S. Appl. No. 12/194,130, Kenichiro Nakata et al., filed Aug. 19, 2008.
U.S. Appl. No. 12/197,447, Kenichiro Nakata et al., filed Aug. 25, 2008.
U.S. Appl. No. 12/210,409, Koji Ishizuka et al., filed Sep. 15, 2008.

(Continued)

*Primary Examiner*—Lisa M Caputo
*Assistant Examiner*—Freddie Kirkland, III
(74) *Attorney, Agent, or Firm*—Nixon & Vanderhye, PC

(57) ABSTRACT

A cylinder characteristic variation sensing device has a small injection controlling section that performs small injections sequentially in respective cylinders, a torque increase amount sensing section that senses an increase amount of output torque caused in connection with the small injection for each cylinder, an injection quantity sensing section that senses an actual injection quantity of the small injection for each cylinder, and a cylinder characteristic variation calculating section that calculates a variation in a cylinder characteristic among the cylinders (i.e., a cylinder characteristic variation) based on a variation in the sensing value of the injection quantity sensing section among the cylinders (i.e., an injection quantity variation) and a variation in the sensing value of the torque increase amount sensing section among the cylinders (i.e., a torque increase amount variation).

14 Claims, 7 Drawing Sheets

OTHER PUBLICATIONS

U.S. Appl. No. 12/195,609, Kenichiro Nakata et al., filed Aug. 21, 2008.
U.S. Appl. No. 12/210,440, Kenichiro Nakata et al., filed Sep. 15, 2008.
U.S. Appl. No. 12/235,917, Kenichiro Nakata et al., filed Sep. 23, 2008.
U.S. Appl. No. 12/233,800, Kenichiro Nakata et al., filed Sep. 19, 2008.
U.S. Appl. No. 12/186,038, Kenichiro Nakata et al., filed Aug. 5, 2008.
U.S. Appl. No. 12/194,917, Kenichiro Nakata et al., filed Aug. 20, 2008.
U.S. Appl. No. 12/187,638, Kenichiro Nakata et al., filed Aug. 7, 2008.
U.S. Appl. No. 12/189,376, Kenichiro Nakata et al., filed Aug. 11, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.

* cited by examiner

CYLINDER CHARACTERISTIC VARIATION SENSING DEVICE

CROSS REFERENCE TO RELATED APPLICATION

This application is based on and incorporates herein by reference Japanese Patent Application No. 2007-279638 filed on Oct. 26, 2007.

BACKGROUND OF THE INVENTION

1. Field of the Invention

The present invention relates to a cylinder characteristic variation sensing device that senses a variation among characteristics of respective cylinders of a multi-cylinder internal combustion engine.

2. Description of Related Art

Conventionally, FCCB correction for correcting fuel injection quantities of the respective cylinders is known as correction for smoothing a variation in an injection quantity among cylinders (i.e., an injection quantity variation) caused by individual differences and aging degradation of injectors provided in the respective cylinders and the like in a multi-cylinder internal combustion engine (for example, refer to Patent document 1: JP-A-2001-355500). In the FCCB correction, sensing values of rotation speed of a crankshaft corresponding to combustion strokes of the respective cylinders are extracted from the sensing values of the rotation speed of the crankshaft. A variation among the extracted rotation speeds corresponding to the respective cylinders is regarded as a variation among output torque magnitudes generated by the respective cylinders. The rotation speeds corresponding to the respective cylinders are compared with an average value of the rotation speeds of all the cylinders, and increase/decrease correction (FCCB correction) of the fuel injection quantities of the respective cylinders is performed to smooth the variation in the rotation speed among the cylinders.

The factors of the variation in the output torque among the cylinders include a difference in characteristics of the respective cylinders (a variation in cylinder characteristics) in addition to the above-mentioned variation in the injection quantity among the cylinders. For example, the cylinder characteristic variation includes a variation in various frictions in the cylinders, a variation in compression ratios in the cylinders, a distribution variation of recirculated exhaust gas to the respective cylinders by EGR (exhaust gas recirculation) (shown by a solid line L1 in FIG. 5), a distribution variation of supercharging pressure to the respective cylinders by a supercharger (shown by a broken line L2 in FIG. 5) and the like.

However, in the above-described FCCB correction, even when the injection quantity variation is not caused, the increase/decrease correction of the injection quantity will be performed for the variation in the output torque among the cylinders (or the variation in the rotation speed among the cylinders) resulting from the cylinder characteristic variation. Therefore, the output torque and an emission state of the internal combustion cannot be controlled with high accuracy.

SUMMARY OF THE INVENTION

It is an object of the present invention to provide a cylinder characteristic variation sensing device that senses a variation in a cylinder characteristic among cylinders in a multi-cylinder internal combustion engine.

According to an aspect of the present invention, a cylinder characteristic variation sensing device is applied to a multi-cylinder internal combustion engine having a plurality of cylinders and a plurality of injectors respectively provided to the cylinders. The cylinder characteristic variation sensing device has a small injection controlling section, a torque increase amount sensing section, an injection quantity sensing section, and a cylinder characteristic variation calculating section.

The small injection controlling section performs small injections sequentially in the respective cylinders, thereby injecting a small quantity of fuel from each injector regardless of manipulation performed by a driver to operate the internal combustion engine.

The torque increase amount sensing section senses an increase amount of output torque caused in connection with the small injection or a physical quantity relevant to the increase amount (referred to simply as a torque increase amount, hereinafter) for each cylinder.

The injection quantity sensing section senses an actual injection quantity of the small injection or a physical quantity relevant to the injection quantity (referred to simply as an injection quantity, hereinafter) for each cylinder.

The cylinder characteristic variation calculating section calculates a variation in a cylinder characteristic among the cylinders (a cylinder characteristic variation) based on a variation in the sensing value of the injection quantity sensing section among the cylinders (an injection quantity variation) and a variation in the sensing value of the torque increase amount sensing section among the cylinders (a torque increase amount variation).

That is, according to the above-described aspect of the present invention, output torque is increased by the small injection, and the torque increase amount and the injection quantity at that time are sensed. The cylinder characteristic variation is calculated based on the injection quantity variation and the torque increase amount variation. If the torque increase amount variation occurs in a mode different from that of the injection quantity variation, it can be determined that the difference in the variation mode is not caused by the injection quantity variation but is caused by a difference in the characteristics of the respective cylinders. In this case, the cylinder characteristic variation can be calculated.

For example, a deviating degree of the torque increase amount sensing value from the injection quantity sensing value is calculated for each cylinder as the cylinder characteristic value. For example, the deviating degree is a ratio of the torque increase amount sensing value to a torque increase amount converted from the injection quantity sensing value. A variation in the calculated cylinder characteristic value among the cylinders is calculated as the cylinder characteristic variation.

According to the above-described aspect of the present invention capable of sensing the cylinder characteristic variation in this way, variation amounts of the cylinder characteristics of the respective cylinders can be calculated and learned, for example. The injection quantity variation can be calculated based on the actual injection quantities of the respective cylinders sensed with the injection quantity sensing section, and the calculation results can be learned. Thus, the cylinder characteristic variation and the injection quantity variation can be learned separately. For example, by changing control contents of the injection mode (such as the injection quantity, injection timing, and the number of injection stages in the case of multi-stage injection) based on the learning result, the output torque and the emission state of the internal combustion can be controlled with high accuracy.

The small injection described above should be preferably performed during a no-injection operation period in which the fuel injection of all the injectors is cut (for example, a period in which the driver does not operate the accelerator). With such the construction, the small injection is performed in a state where little or no fluctuation is caused in the output torque. Accordingly, the torque increase amount sensing section can sense the output torque increase amount or the like with high sensing accuracy.

The injection quantity of the above-described small injection should be preferably small (e.g., 2 mm$^3$/st (mm$^3$ per stroke)) to such an extent that the driver of the internal combustion engine (e.g., a driver of a vehicle, in which the internal combustion engine is mounted) does not feel the torque increase when the output torque is increased by the small injection. In the case where a diesel engine is adopted as the internal combustion engine and the injector can perform multi-stage injection for performing the injection multiple times per combustion cycle, it is preferable to perform the small injection with a quantity (for example, a quantity corresponding to a pilot injection or a pre-injection) smaller than a quantity of a main injection in the multi-stage injection. Thus, a degree of increase of the engine rotation speed against an intention of the driver of the internal combustion engine can be reduced during the above-described no-injection operation period.

According to another aspect of the present invention, the small injection controlling section performs the small injection in a state where the injection quantities of the respective cylinders are equalized so that the sensing values of the injection quantity sensing section coincide with each other among all the cylinders. The cylinder characteristic variation calculating section calculates the variation in the cylinder characteristic among the cylinders while bringing the variation in the sensing value of the injection quantity sensing section among the cylinders to zero.

That is, by equalizing the actual injection quantities of the respective cylinders, the variation in the injection quantity among the cylinders is brought to zero, and the variation in the cylinder characteristic among the cylinders is calculated based on the variation in the torque increase amount among the cylinders. Therefore, the variation in the cylinder characteristic among the cylinders can be calculated in a state where the various conditions relating to the injection quantity (such as a ratio of an intake quantity to the injection quantity) are equalized. Accordingly, the elements of the variation in the above-described various conditions among the cylinders can be eliminated from the calculation result of the cylinder characteristic variation calculating section (i.e., the cylinder characteristic variation). As a result, the cylinder characteristic variation can be obtained with high accuracy.

According to another aspect of the present invention, the internal combustion engine has an exhaust gas recirculation valve for regulating an exhaust gas recirculation quantity recirculated from an exhaust system to an intake system. The small injection controlling section performs the small injection in a state where the exhaust gas recirculation valve is fully closed. Therefore, it can be determined that the element of the distribution variation of the recirculated exhaust gas (shown by the solid line L1 in FIG. 5) is eliminated from the calculation result of the cylinder characteristic variation calculating section (i.e., the cylinder characteristic variation). Thus, the cylinder characteristic variation, from which the distribution variation element of the recirculated exhaust gas is removed, can be obtained.

According to another aspect of the present invention, the small injection controlling section performs the small injection during a deceleration period of a vehicle, in which the internal combustion engine is mounted. The small injection controlling section performs the small injections sequentially in the respective cylinders at a predetermined interval or at predetermined intervals during the same deceleration period. With such the construction, the small injections are performed sequentially during the same deceleration period. Therefore, the small injections are performed in a state where various conditions such as fuel temperature as of the small injection are equalized among all the cylinders. As a result, the cylinder characteristic variation can be obtained with high accuracy.

According to another aspect of the present invention, the cylinder characteristic variation sensing device further has a correcting section that sets a reference characteristic for the cylinder characteristics of all the cylinders and that corrects fuel injection start timing of the cylinder in accordance with a variation amount of the cylinder characteristic of the same cylinder with respect to the reference characteristic. The element of the injection quantity variation is removed from the cylinder characteristic variation calculated by the cylinder characteristic variation calculating section. Therefore, according to the above-described aspect of the present invention that corrects the injection start timing as the element other than the injection quantity in accordance with the variation amount of the cylinder characteristic, a combustion state in each cylinder can be stabilized with high accuracy.

For example, the fuel injection start timing is advanced in the cylinder, the calculated cylinder characteristic of which indicates ignitability worse than the reference characteristic. The fuel injection start timing is delayed in the cylinder, the calculated cylinder characteristic of which indicates the ignitability better than the reference characteristic. Thus, the state of the ignitability of each cylinder can be approximated to the reference characteristic, thereby stabilizing the combustion state.

According to another aspect of the present invention, the cylinder characteristic variation sensing device further has a learning section that sets a reference characteristic for the cylinder characteristics of all the cylinders and that stores and learns a variation amount of the cylinder characteristic with respect to the reference characteristic for each cylinder. Thus, the combustion state of each cylinder can be easily approximated to an ideal state.

According to another aspect of the present invention, an average value of the cylinder characteristics of all the cylinders is set as the reference characteristic. Accordingly, it is unnecessary to set the reference characteristic by adaptation and the like, thereby reducing a burden of the calculation processing of the cylinder characteristic variation. As a setting method other than the method of setting the average value of the cylinder characteristics of all the cylinders as the reference characteristic, a method of calculating and setting a value of the reference characteristic as a theoretical value based on values of engine rotation speed, an engine load (for example, a fuel injection quantity, an accelerator operation amount or the like), an oxygen concentration in exhaust gas and the like may be used.

According to another aspect of the present invention, the internal combustion engine is structured to distribute and supply the fuel from a pressure accumulator, which accumulates the fuel, to the injector. The injection quantity sensing section is a fuel pressure sensor for sensing pressure of the fuel supplied to the injector as the physical quantity and is arranged in a fuel passage, which extends from the pressure accumulator to an injection hole of the injector, at a position closer to the injection hole than the pressure accumulator.

The pressure of the fuel supplied to the injector fluctuates in connection with the fuel injection from the injection hole.

Therefore, by sensing the fluctuation mode (e.g., a fuel pressure decrease amount, a fuel pressure decrease time, and the like), the actual injection quantity can be calculated. According to the above-described aspect of the present invention focusing attention on this point, the fuel pressure sensor that senses the pressure of the fuel supplied to the injector as the physical quantity relevant to the injection quantity is adopted as the injection quantity sensing section. Therefore, the injection quantity can be calculated as mentioned above.

Moreover, according to the above-described aspect of the present invention, the fuel pressure sensor is arranged in the fuel passage, which extends from the pressure accumulator to the injection hole, at the position closer to the injection hole than the pressure accumulator. Therefore, the pressure fluctuation in the injection hole can be sensed before the pressure fluctuation attenuates in the pressure accumulator. Therefore, the pressure fluctuation caused in connection with the injection can be sensed with high accuracy, so the injection quantity can be calculated with high accuracy.

The fluctuation of the fuel pressure caused in connection with the small injection by the small injection controlling section is very small. Therefore, it is difficult to sense such the fluctuation of the fuel pressure with a fuel pressure sensor (a rail pressure sensor) provided to the pressure accumulator. Therefore, by applying the above-described aspect of the present invention to the case of the small injection that makes the sensing difficult, the above-described effect of enabling the sensing of the pressure fluctuation with high accuracy can be suitably exerted.

As other examples than adopting the fuel pressure sensor as the injection quantity sensing section, a lift sensor that senses a valve member lift amount of the injector as a physical quantity relevant to the injection quantity, a flow meter arranged in a fuel supply passage extending to the injection hole for sensing a fuel flow rate as the injection quantity or the like may be adopted as the injection quantity sensing section.

According to another aspect of the present invention, the fuel pressure sensor is fixed to the injector. Therefore, the fixation position of the fuel pressure sensor is closer to the injection hole than in the case where the fuel pressure sensor is fixed to a pipe connecting the pressure accumulator and the injector. Accordingly, the pressure fluctuation in the injection hole can be sensed more appropriately than in the case where the pressure fluctuation is sensed after the pressure fluctuation in the injection hole attenuates in the pipe.

According to another aspect of the present invention, the fuel pressure sensor is fixed to a fuel inlet of the injector. According to another aspect of the present invention, the fuel pressure sensor is mounted inside the injector to sense fuel pressure in an internal fuel passage extending from the fuel inlet of the injector to the injection hole of the injector.

The fixing structure of the fuel pressure sensor can be simplified in the case where the fuel pressure sensor is fixed to the fuel inlet as compared with the case where the fuel pressure sensor is mounted inside the injector. When the fuel pressure sensor is mounted inside the injector, the fixing position of the fuel pressure sensor is closer to the injection hole of the injector than in the case where the fuel pressure sensor is fixed to the fuel inlet. Therefore, the pressure fluctuation in the injection hole can be sensed more appropriately.

According to another aspect of the present invention, an orifice is provided in a fuel passage, which extends from the pressure accumulator to a fuel inlet of the injector, for attenuating a pressure pulsation of the fuel in the pressure accumulator. The fuel pressure sensor is arranged downstream of the orifice with respect to a fuel flow direction. If the fuel pressure sensor is arranged upstream of the orifice, the pressure fluctuation after the pressure fluctuation in the injection hole is attenuated by the orifice is sensed. In contrast, the fuel pressure sensor is arranged downstream of the orifice according to the above-described aspect of the present invention. Accordingly, the pressure fluctuation in the injection hole can be sensed more appropriately since the pressure fluctuation before the pressure fluctuation is attenuated by the orifice can be sensed.

According to yet another aspect of the present invention, the torque increase amount sensing section is a rotation speed sensor for sensing rotation speed of an output shaft of the internal combustion engine (engine rotation speed) as the physical quantity. If the torque increases, the rotation speed of the output shaft also increases in accordance with the increase amount of the torque. Therefore, according to the above-described aspect of the present invention that adopts the rotation speed sensor as the torque increase amount sensing section, the increase amount of the output torque can be suitably calculated. As other examples than adopting the rotation speed sensor as the torque increase amount sensing section, a cylinder pressure sensor for sensing pressure in a combustion chamber of the internal combustion engine as a physical quantity relevant to the torque increase amount and the like may be adopted as the torque increase amount sensing section.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereafter, an embodiment of the present invention will be described with reference to the drawings. First, an outline of an engine (an internal combustion engine) having an internal combustion engine control device according to the present embodiment will be explained briefly.

The device according to the present embodiment is used for a diesel engine (an internal combustion engine) for a four-wheeled vehicle. The engine performs injection supply (direct injection supply) of high-pressure fuel (for example, light oil at injection pressure of 1000 atmospheres or higher) directly into a combustion chamber. It is assumed that the engine according to the present embodiment is a four-stroke reciprocating diesel engine (an internal combustion engine) having multiple cylinders (for example, in-line four cylinders). In each of the four cylinders #1 to #4, a combustion cycle consisting of four strokes of an intake stroke, a compression stroke, a combustion stroke, and an exhaustion stroke is sequentially performed in the order of the cylinders #1, #3, #4, and #2 in the cycle of 720° C.A (degree crank angle), and in more detail, while the combustion cycles are deviated from each other by 180° C.A between the cylinders.

Next, a fuel system of the engine will be explained with reference to FIGS. 1 to 4.

Figure 1:
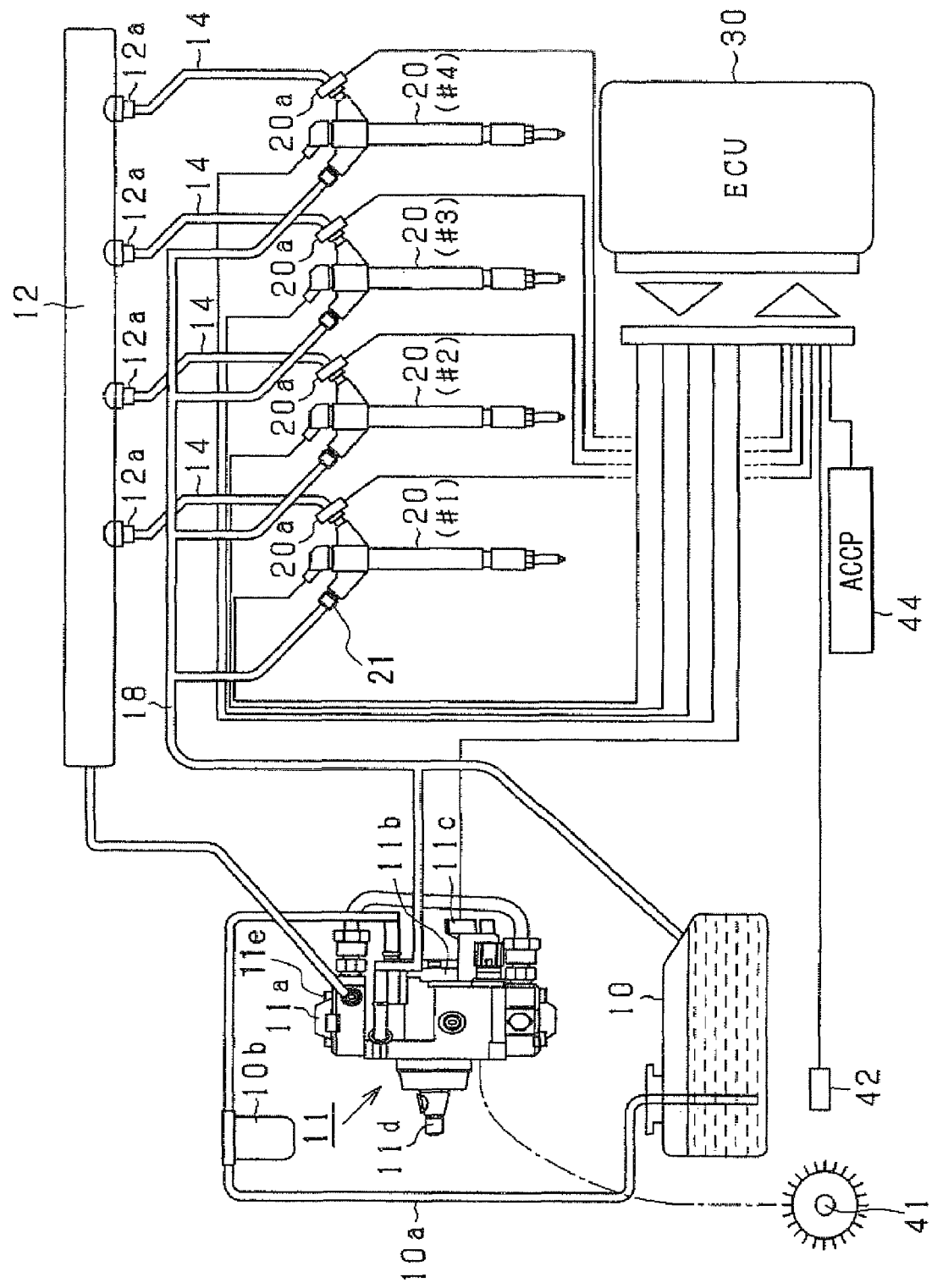
FIG. 1 is a configuration diagram showing a fuel system including a cylinder characteristic variation sensing device according to an embodiment of the present invention.

FIG. 1 is a configuration diagram showing a common rail fuel injection system according to the present embodiment. An ECU 30 (an electronic control unit) provided in the system adjusts a supply quantity of current supplied to a suction control valve 11c, thereby controlling a fuel discharge quantity of a fuel pump 11 to a desired value. Thus, the ECU 30 performs feedback control (for example, PID control) for conforming fuel pressure in a common rail 12 (a pressure accumulator), i.e., current fuel pressure measured with a fuel pressure sensor 20a, to a target value (target fuel pressure). The ECU 30 controls a fuel injection quantity of a predetermined cylinder of the target engine and eventually an output of the engine (i.e., rotation speed or torque of an output shaft) to desired magnitudes based on the fuel pressure.

The devices constituting the fuel supply system including the fuel tank 10, the fuel pump 11 the common rail 12, and the injectors 20 (fuel injection valves) are arranged in this order from a fuel flow upstream side. The fuel pump 11 consists of a high-pressure pump 11a and a low-pressure pump 11b driven by an output of the target engine. The fuel pump 11 is structured such that fuel drawn by the low-pressure pump 11b from the fuel tank 10 is pressurized and discharged by the high-pressure pump 11a. A fuel pumping quantity sent to the high-pressure pump 11a and an eventual fuel discharge quantity of the fuel pump 11 are metered by the suction control valve 11c (SCV) provided on a fuel suction side of the fuel pump 11. The fuel pump 11 controls the fuel discharge quantity from the pump 11 to a desired value by regulating the drive current (eventually, an opening degree) of the suction control valve 11c.

The low-pressure pump 11b is constituted as a trochoid feed pump, for example. The high-pressure pump 11a consists of a plunger pump, for example. The high-pressure pump 11a is structured to be able to sequentially pump the fuel, which is sent to pressurization chambers, at predetermined timing by reciprocating predetermined plungers (for example, three plungers) in axial directions thereof with an eccentric cam (not illustrated) respectively.

The fuel in the fuel tank 10 is pressure-fed (pumped) to the common rail 12 by the fuel pump 11 and is accumulated in the common rail 12 at a high-pressure state. Then, the fuel is distributed and supplied to the injectors 20 of the cylinders #1 to #4 respectively through high-pressure pipes 14 provided to the respective cylinders. Fuel discharge holes 21 of the injectors 20 (#1) to 20 (#4) are connected with a pipe 18 for returning excess fuel to the fuel tank 10. An orifice 12a (a fuel pulsation reducing section) is provided between the common rail 12 and the high-pressure pipe 14 for attenuating a pressure pulsation of the fuel flowing from the common rail 12 to the high-pressure pipe 14.

Figure 2:
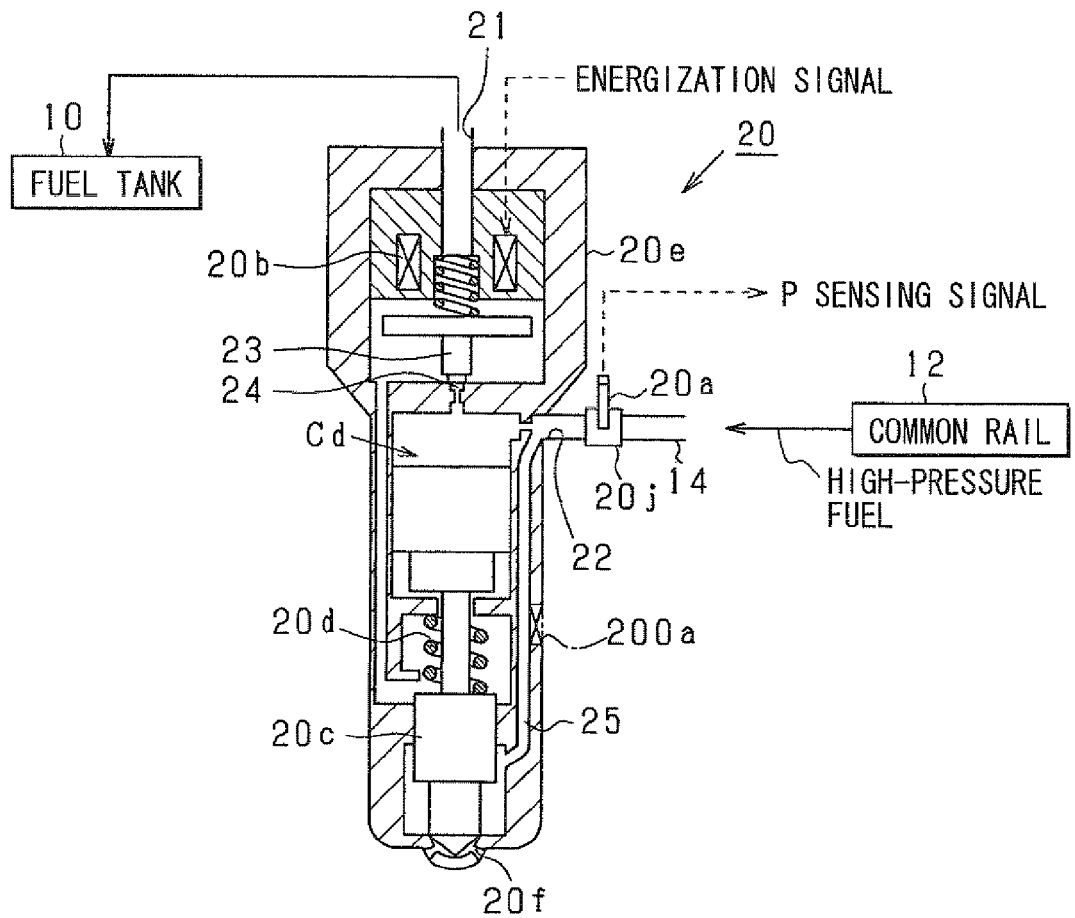
FIG. 2 is an internal side view schematically showing an internal structure of an injector according to the embodiment.

A detailed structure of the injector 20 is shown in FIG. 2. Basically, the four injectors 20 (#1) to 20 (#4) have the same structure (for example, a structure shown in FIG. 2). Each injector 20 is a hydraulic drive type injector using the engine combustion fuel (i.e., the fuel in the fuel tank 10). In the injector 20, a driving power for the fuel injection is transmitted through an oil pressure chamber Cd (i.e., a control chamber). As shown in FIG. 2, the injector 20 is structured as a fuel injection valve of a normally-closed type that is brought to a valve-closed state when de-energized.

The high-pressure fuel sent from the common rail 12 flows into a fuel inlet 22 formed in a housing 20e of the injector 20. Part of the inflowing high-pressure fuel flows into the oil pressure chamber Cd and the other part of the inflowing high-pressure fuel flows toward injection holes 20f. A leak hole 24 is formed in the oil pressure chamber Cd and is opened and closed by a control valve 23. If the leak hole 24 is opened by the control valve 23, the fuel in the oil pressure chamber Cd is returned to the fuel tank 10 through the fuel discharge hole 21 from the leak hole 24.

When the fuel injection is performed with the injector 20, the control valve 23 is operated in accordance with an energization state (energization/de-energization) of a solenoid 20b constituting a two-way electromagnetic valve. Thus, a sealed degree of the oil pressure chamber Cd and eventually pressure in the oil pressure chamber Cd (equivalent to back pressure of a needle valve 20c) are increased/decreased. Due to the increase/decrease in the pressure, the needle valve 20c reciprocates (moves upward and downward) inside the housing 20e along with or against an extensional force of a spring 20d (a coil spring) (i.e., an elastic force of the spring 20d to extend). Accordingly, a fuel supply passage 25 extending to the injection holes 20f (a necessary number of which are bored) is opened/closed at a halfway thereof (more specifically, at a tapered seat face, which the needle valve 20c is seated on and which the needle valve 20c is separated from in accordance with the reciprocating movement of the needle valve 20c).

Drive control of the needle valve 20c is performed through on-off control. That is, a pulse signal (an energization signal) directing ON/OFF is sent from the ECU 30 to a drive section (the two-way electromagnetic valve) of the needle valve 20c. The needle valve 20c lifts and opens the injection holes 20f when the pulse is ON (or OFF), and the needle valve 20c descends to block the injection holes 20f when the pulse is OFF (or ON).

The pressure increase processing of the oil pressure chamber Cd is performed by the fuel supply from the common rail 12. Pressure reduction processing of the oil pressure chamber Cd is performed by operating the control valve 23 through the energization to the solenoid 20b and thus opening the leak hole 24. Thus, the fuel in the oil pressure chamber Cd is returned to the fuel tank 10 through the pipe 18 (shown in FIG. 1) connecting the injector 20 and the fuel tank 10. That is, the operation of the needle valve 20c that opens and closes the injection holes 20f is controlled by adjusting the fuel pressure in the oil pressure chamber Cd through the opening and closing operation of the control valve 23.

Thus, the injector 20 has the needle valve 20c that performs valve opening and valve closing of the injector 20 by opening and closing the fuel supply passage 25 extending to the injection holes 20f through the predetermined reciprocation operation inside the valve body (i.e., the housing 20e). In a non-driven state, the needle valve 20c is displaced in a valve-closing direction by the force (the extensional force of the spring 20d) constantly applied to the needle valve 20c in the valve-closing direction. In a driven state, the needle valve 20c is applied with a driving force, so the needle valve 20c is displaced in a valve-opening direction against the extensional force of the spring 20d. The lift amount of the needle valve 20c changes substantially symmetrically between the non-driven state and the driven state.

A fuel pressure sensor 20a (also refer to FIG. 1) for sensing the fuel pressure is fixed to the injector 20. The fuel inlet 22 formed in the housing 20e and the high-pressure pipe 14 are connected through a jig 20j, and the fuel pressure sensor 20a is fixed to the jig 20j. Thus, by fixing the fuel pressure sensor 20a to the fuel inlet 22 of the injector 20 in this way, fuel pressure (inlet pressure) at the fuel inlet 22 can be sensed at any time. More specifically, a fluctuation waveform of the fuel pressure accompanying an injection operation of the injector 20, a fuel pressure level (i.e., stable pressure), fuel injection pressure and the like can be sensed (measured) with the output of the fuel pressure sensor 20a.

The fuel pressure sensors 20a are provided to the multiple injectors 20 (#1) to 20 (#4) respectively. The fluctuation waveform of the fuel pressure accompanying the injection operation of the injector 20 concerning a predetermined injection can be sensed with high accuracy based on the outputs of the fuel pressure sensors 20a (as mentioned in more detail later).

A microcomputer mounted in the ECU 30 consists of a CPU (a basic processing unit) for performing various kinds of computation, a RAM as a main memory for temporarily storing data in the process of the computation, computation results and the like, a ROM as a program memory, an EEPROM as a memory for data storage, a backup RAM (a memory invariably supplied with power from a backup power supply such as an in-vehicle battery even after a main power supply of the ECU 30 is stopped), and the like. Various kinds of programs, control maps and the like concerning the engine control including the program concerning the fuel injection control are beforehand stored in the ROM. Various kinds of control data including design data of the target engine and the like are beforehand stored in the memory for data storage (for example, the EEPROM).

The ECU 30 calculates a rotation angle position, rotation speed (engine rotation speed NE) of an output shaft (a crankshaft 41) of the target engine based on the sensing signal inputted from the crank angle sensor 42. The ECU 30 calculates an operation amount ACCP (a pressed amount) of the accelerator by the driver based on the sensing signal inputted from the accelerator sensor 44. The ECU 30 grasps the operation state of the target engine and requests of the user based on the sensing signals of the above-described various sensors 42, 44 and various sensors mentioned later. The ECU 30 performs various kinds of control relating to the above-described engine in the optimum modes corresponding to the situation of each time by operating the various actuators such as the above-described suction control valve 11c and the injectors 20 in accordance with the operation state of the target engine and the requests of the user.

Next, an outline of control of the fuel system performed by the ECU 30 will be explained.

The microcomputer of the ECU 30 calculates the fuel injection quantity in accordance with the engine operation state (such as the engine rotation speed NE), the operation amount ACCP of the accelerator by the driver and the like at each time and outputs an injection control signal (an injection command signal) for directing the fuel injection with the calculated fuel injection quantity to the injector 20 in synchronization with desired injection start timing. When the injector 20 operates with a drive amount (for example, a valve opening period) corresponding to the injection control signal, the output torque of the target engine is controlled to a target value.

Figure 3:
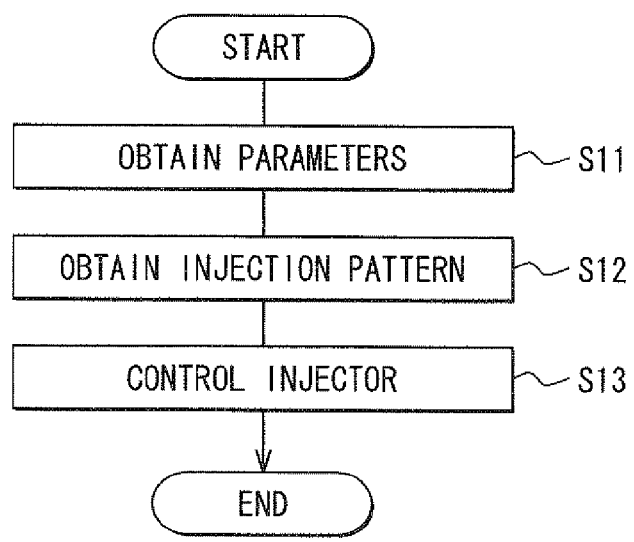
FIG. 3 is a flowchart showing a basic procedure of fuel injection control processing according to the embodiment.

Hereafter, a fundamental processing procedure of the fuel system control according to the present embodiment will be explained with reference to FIG. 3. Values of various parameters used in the processing shown in FIG. 3 are stored at any time in the storage device mounted in the ECU 30 such as the RAM, the EEPROM or the backup RAM and are updated at any time when necessary. The processing of FIG. 3 is performed based on the program stored in the ROM of the ECU 30.

As shown in FIG. 3, first in S11 (S means "Step") in a series of the processing, predetermined parameters such as the current engine rotation speed NE (i.e., an actual measurement value measured by the crank angle sensor 42) and the fuel pressure (i.e., an actual measurement value measured by the fuel pressure sensor 20a) are read and also the accelerator operation amount ACCP (i.e., an actual measurement value measured by the accelerator sensor 44) by the driver at the time and the like are read.

In following S12, an injection pattern is set based on the various parameters read in S11. For example, in the case of a single-stage injection, an injection quantity Q (an injection period) of the injection is variably set in accordance with the torque that should be generated in the output shaft (the crankshaft 41), i.e., the request torque that is calculated from the accelerator operation amount ACCP and the like and that is equivalent to the engine load at the time. In the case of a multi-stage injection, a total injection quantity Q (a total injection period) of injections contributing to torque is variably set in accordance with the torque that should be generated in the crankshaft 41, i.e., the request torque.

Figure 4:
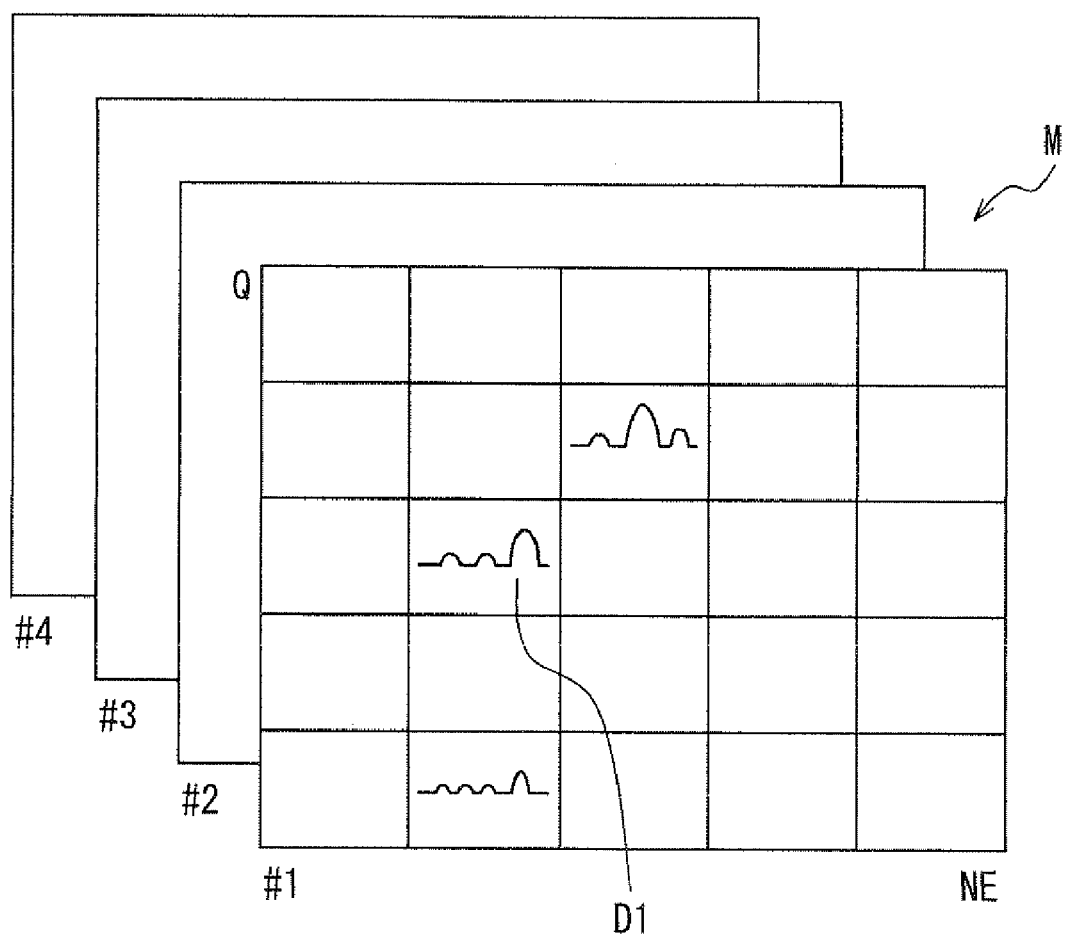
FIG. 4 is a diagram showing an injection control map according to the embodiment.

The injection pattern is obtained based on a map M (an injection control map or a mathematical expression) shown in FIG. 4 stored in the EEPROM, for example. The injection pattern is a pattern optimized to achieve the request torque and a suitable emission state. More specifically, the optimum injection patterns (adaptation values) are beforehand obtained by experiment and the like in anticipated ranges of the predetermined parameters (read in S11) and are written in the injection control map M, for example.

For example, the injection pattern is defined by parameters such as the number of injection stages (i.e., the time number of injections performed in one combustion cycle), the injection start timing of each injection and the injection period of each injection (equivalent to the injection quantity). The map M according to the present embodiment defines the relationship among the total injection quantity Q, the engine rotation speed NE, and the injection pattern. The map M is provided for each one of the injectors 20 of the respective cylinders #1 to #4. The map M may be provided for each of other parameters such as engine coolant temperature.

A command value (a command signal) for the injector 20 is set based on the injection pattern obtained using the injection control map M. Thus, the pilot injection, the pre-injection, the after injection, the post-injection and the like are suitably performed with the main injection in accordance with the situation of the vehicle and the like.

The injection pattern obtained based on the injection control map M is corrected with the correction coefficient (stored in the EEPROM in the ECU 30, for example) that is separately updated. For example, a set value is calculated by dividing the map value by the correction coefficient. Thus, the injection pattern of the injection that should be performed at the time and eventually the command signal for the injector 20 corresponding to the injection pattern are obtained. The correction coefficient (more strictly, a predetermined coefficient out of the multiple types of coefficients) is sequentially updated by separate processing during the operation of the internal combustion engine.

The thus-set injection pattern or the eventual command value (the command signal) corresponding to the injection pattern are used in following S13. That is, in S13, the drive of the injector 20 is controlled based on the command value (the command signal), or in more detail, by outputting the command signal to the injector 20. After the drive control of the injector 20, the series of the processing shown in FIG. 3 is ended.

Next, an intake-exhaust system of the engine will be explained with reference to FIG. 5.

Figure 5:
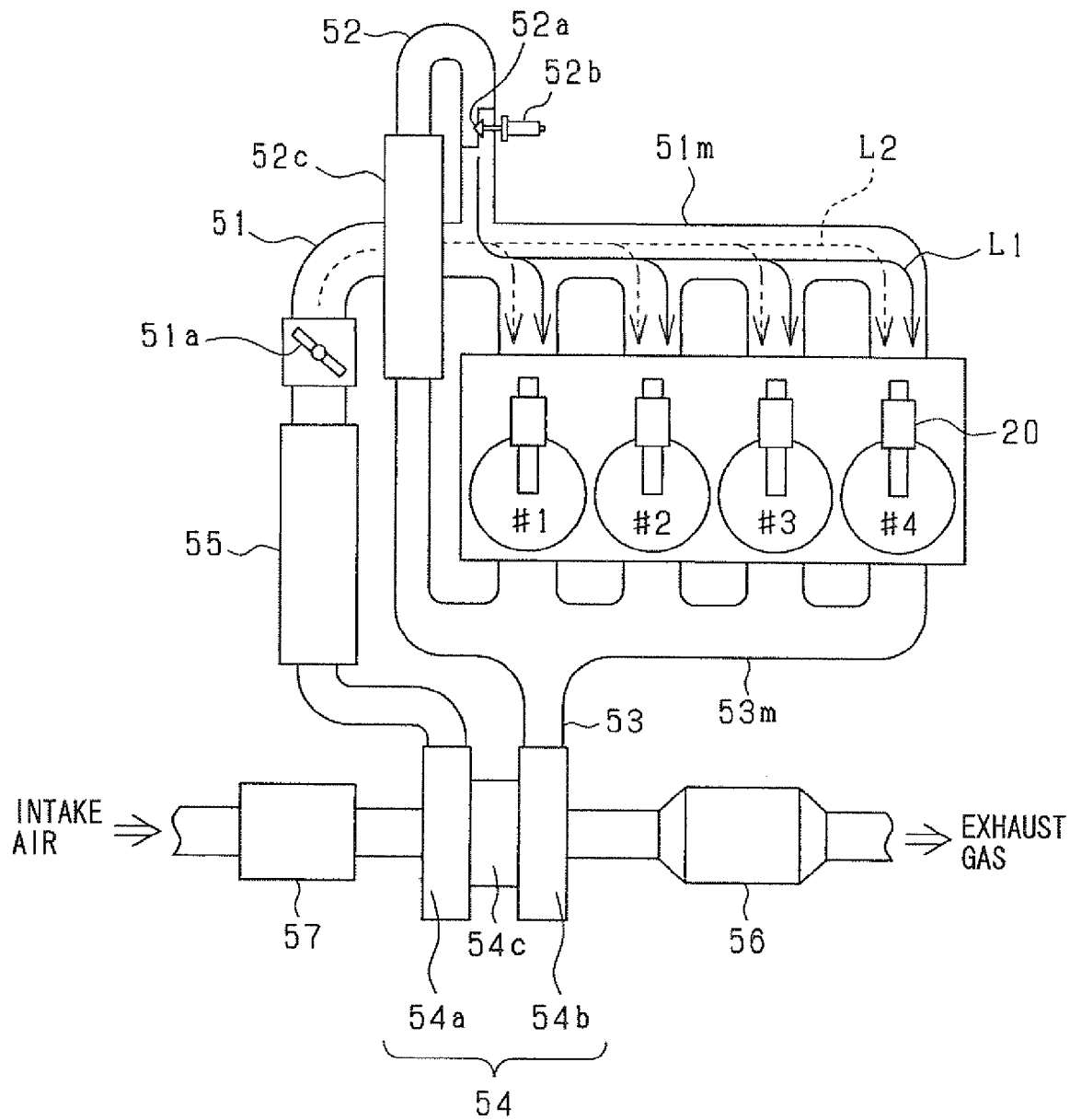
FIG. 5 is a configuration diagram showing an intake-exhaust system according to the embodiment.

FIG. 5 is a configuration diagram showing the intake-exhaust system of the engine shown in FIG. 1. The engine has an EGR pipe 52 for recirculating exhaust gas from an exhaust system to an intake system. The engine returns a part of the exhaust gas to the intake pipe 51, thereby lowering the combustion temperature and reducing the NOx, for example. An EGR valve 52a for regulating an EGR quantity (i.e., an exhaust gas recirculation quantity) is provided in the EGR pipe 52. An electric actuator 52b causes the EGR valve 52a to perform opening and closing action. The EGR quantity is maximized at the time of fully-opening action of the EGR valve 52a and is brought to zero at the time of fully-closing action of the EGR valve 52a.

Fresh air from the intake pipe 51 and the recirculated exhaust gas from the EGR pipe 52 are distributed to the respective cylinders #1 to #4 by an intake manifold 51m. The exhaust gas from the respective cylinders #1 to #4 is collected by an exhaust manifold 53m. Then, a part of the exhaust gas flows into the EGR pipe 52 and is recirculated, and the other part is discharged through an exhaust pipe 53. An EGR cooler 52c is provided in the EGR pipe 52 for cooling the recirculated exhaust gas, thereby reducing the volume (i.e., increasing density) of the recirculated exhaust gas. Thus, the EGR cooler 52c aims to improve a charging efficiency of the intake air flowing into a combustion chamber.

A throttle valve 51a that adjusts a flow rate of the fresh air in the intake air flowing into the combustion chamber is provided in the intake pipe 51 upstream of a point where the EGR pipe 52 is connected to the intake pipe 51. An electric actuator (not shown) causes the throttle valve 51a to perform opening-closing action. The fresh air quantity is maximized at the time of fully-opening action of the throttle valve 51a and is brought to zero at the time of fully-closing action of the throttle valve 51a.

A turbocharger 54 (a supercharger) is provided between the intake pipe 51 and the exhaust pipe 53. The turbocharger 54 has a compressor impeller 54a provided in the intake pipe 51 and a turbine wheel 54b provided in the exhaust pipe 53. The compressor impeller 54a and the turbine wheel 54b are connected through a shaft 54c. In the turbocharger 54, the turbine wheel 54b is rotated by the exhaust gas flowing through the exhaust pipe 53, and the rotating force is transmitted to the compressor impeller 54a through the shaft 54c. The intake air flowing through the inside of the intake pipe 51 is compressed by the compressor impeller 54a, and supercharge is performed. The air supercharged by the turbocharger 54 is cooled by an intercooler 55 and then fed to the downstream side of the intercooler 55. The intercooler 55 cools the intake air to reduce the volume (i.e., to increase the density) of the intake air, thereby improving the charging efficiency of the intake air flowing into the combustion chamber.

A purification device 56 for purifying the exhaust gas is fixed to the exhaust pipe 53 downstream of the turbine wheel 54b. For example, the purification device 56 may be a DPF (diesel particulate filter) for collecting particulate matters in the exhaust gas, a NOx catalyst for purifying the NOx in the exhaust gas, an oxidation catalyst for purifying HC and CO in the exhaust gas, and the like. An air cleaner 57 is provided in the intake pipe 51 upstream of the compressor impeller 54a for removing extraneous matters contained in the intake air.

A variation is caused among output torque magnitudes generated by the respective cylinders #1 to #4. As mentioned above, the factors of the variation in the output torque among the cylinders (a torque variation) include the cylinder characteristic variation in addition to the injection quantity variation. Therefore, in the present embodiment, learning is performed by calculating the cylinder characteristic variation in a state of a real car where the engine is mounted in a vehicle (as mentioned in more detail later) and by chancing and storing the data (the injection pattern) of the injection control map M based on the calculated cylinder characteristic variation.

Hereafter, a processing procedure for calculating the cylinder characteristic variation and for learning the map M will be explained with reference to FIG. 6. For example, the microcomputer of the ECU 30 repeatedly performs the processing of FIG. 6 in a predetermined cycle (for example, a computation cycle of the microcomputer) or at every predetermined crank angle.

In a series of the processing, first in S20, it is determined whether a learning condition is satisfied. For example, the learning condition includes occurrence of a no-injection deceleration period, in which an accelerator is released, the vehicle is brought to a deceleration state, and fuel cut control is performed. Alternatively, the learning condition may be satisfied if the no-injection state occurs even when the deceleration state does not occur. When it is determined that the learning condition is satisfied (S20: YES), processing of subsequent S21 to S25 is performed for each of the cylinders #1 to #4.

In following S21 (a small injection controlling section), a single-stage injection (a single-shot injection) for opening and closing the injection holes 20f only once is performed by controlling the drive of the injector 20. That is, a single shot of a small injection for learning is performed by operating the injector 20, learning of which is desired. A predetermined small quantity of the fuel is injected through the small injection for the learning. More specifically, a command injection period of the injector 20 is calculated from the fuel pressure sensed with the fuel pressure sensor 20a and the small quantity (i.e., the small injection quantity for the learning), and opening operation of the injector 20 is performed in accordance with the command injection period.

The above-described small injection means an injection of a quantity smaller than a main injection such as a pilot injection, a pre-injection and an after injection performed before or after the main injection. The main injection mainly produces output torque required through the operation of the accelerator. In the present embodiment, the small injection quantity is set to 2 $mm^3$/st. Alternatively, multiple kinds of the small injection quantity may be set and the processing of following S22 to S28 may be performed for each of the multiple kinds of the small injection quantity.

In following S22 (a torque increase amount sensing section), a rotation speed increase amount of the crankshaft 41 caused with combustion due to the small injection is sensed using the crank angle sensor 42 (a torque increase amount sensing section). For example, when the small injection by the injector 20 (#1) of the first cylinder #1 is performed, the rotation speed at the small injection timing in the case where the small injection is hypothetically not performed is expressed as $\omega(i-1)+a\times t$, wherein $\omega(i-1)$ is the rotation speed at another timing (i−1) preceding the small injection timing by 720° C.A, a is decreasing speed of the rotation speed at the another timing (i−1), and t is a time necessary for the rotation of 720° C.A to the small injection.

Figure 7:
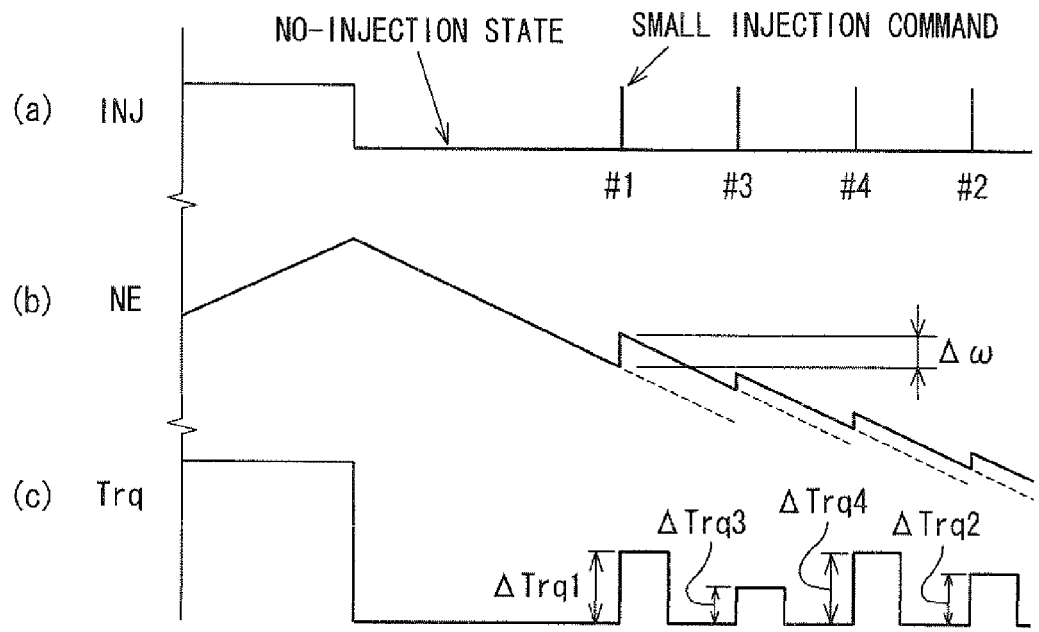
FIG. 7 is a timing chart showing changes in rotation speed and output torque at the time when a small injection is performed in the processing of FIG. 6 according to the embodiment.

Therefore, the rotation increase amount $\Delta\omega$ (refer to part (b) of FIG. 7) accompanying the small injection is calculated by a formula: $\Delta\omega=\omega(i)-\omega(i-1)-a\times t$, using the rotation speed $\omega(i)$ at the time when the small injection is performed. Part (a) of FIG. 7 shows a pulse signal of the injection command INJ and shows a mode, in which small injection commands are outputted while the no-injection state occurs. Part (b) of FIG. 7 shows change of the rotation speed NE caused in connection with the small injections, and part (c) of FIG. 7 is a timing chart showing change of the output torque Trq caused in connection with the small injections. In the present embodiment, as shown in FIG. 7, the small injections are performed in succession in the respective cylinders in the order of the cylinders #1, #3, #4, and #2 (i.e., the order in which the combustion strokes are performed) at predetermined intervals (or a predetermined interval) during the same deceleration period.

Figure 8:
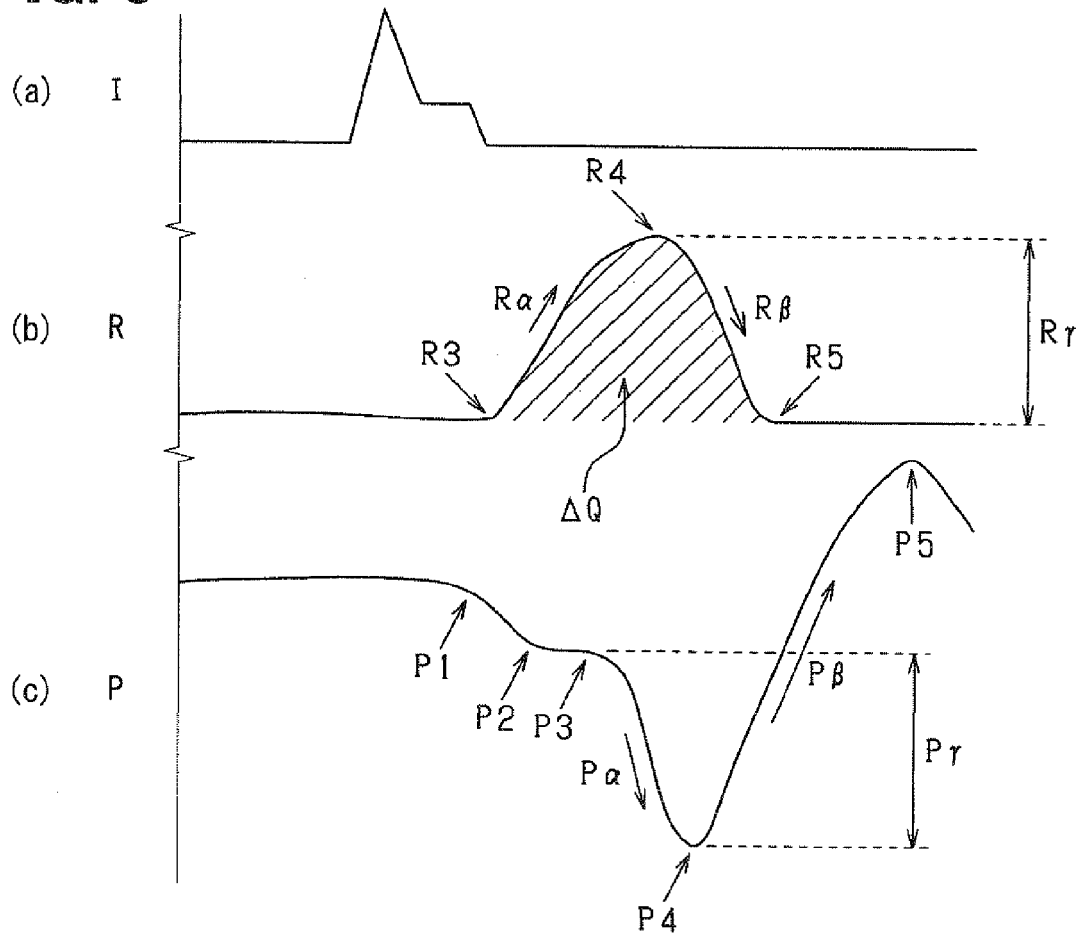
FIG. 8 is a timing chart showing changes in a sensing value of a pressure sensor and an injection rate at the time when the small injection is performed in the processing of FIG. 6 according to the embodiment.

In following S23 (an injection quantity sensing section), fluctuation of the inlet pressure P caused in connection with the small injection (refer to part (c) of FIG. 8) is sensed with the fuel pressure sensor 20a (an injection quantity sensing section). Part (a) of FIG. 8 shows change of driving current I supplied to the solenoid 20b based on the small injection command. Part (b) of FIG. 8 shows change of a fuel injection rate R of the fuel from the injection holes 20f caused in connection with the small injection. Part (c) of FIG. 8 shows change of the sensed value (the inlet pressure P) of the fuel pressure sensor 20a caused with the change of the injection rate R.

Figure 6:
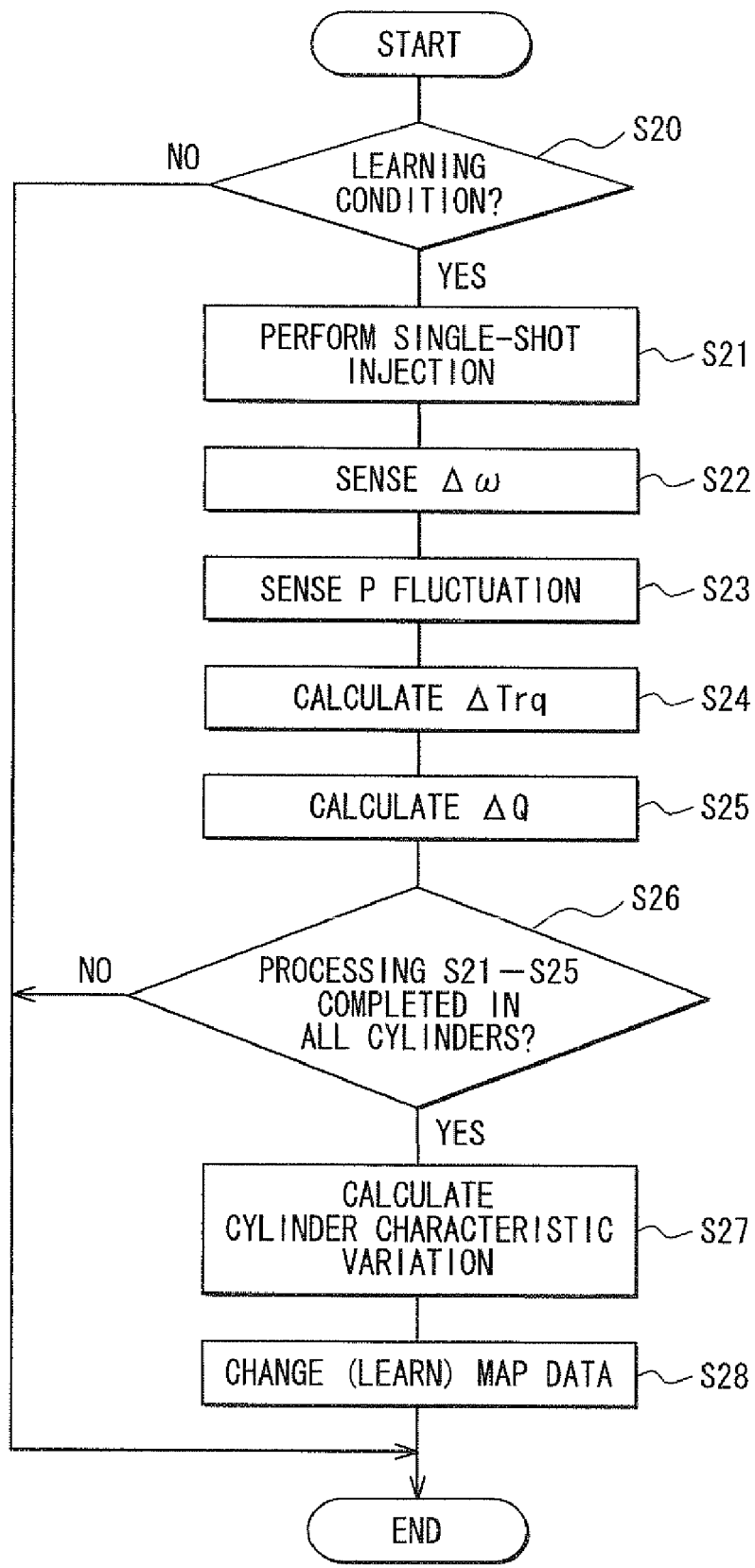
FIG. 6 is a flowchart showing a processing procedure for learning the injection control map according to the embodiment.

The sensing of the fuel pressure fluctuation in S23 is performed by subroutine processing separate from the processing of FIG. 6. It is desirable to serially obtain the sensor output of the fuel pressure sensor 20a by the subroutine processing at an interval short enough to be able to plot the profile of the pressure transition waveform with the sensor output. An example profile is illustrated in part (c) of FIG. 8. More specifically, the sensor output is serially obtained at an interval shorter than 50 microseconds (or more preferably, 20 microseconds).

In following S24, each of increase amounts $\Delta Trq1$ to $\Delta Trq4$ (refer to part (c) of FIG. 7) of the output torque actually caused in connection with the small injections is calculated for each cylinder based on the rotation increase amount $\Delta\omega$ sensed in S22. For example, the increase amount $\Delta Trq1$ of the output torque is calculated by a formula: $\Delta Trq1=b\Delta\omega$ (b is a positive coefficient) or by a map. The increase amounts $\Delta Trq1$ to $\Delta Trq4$ of the output torque may be calculated by performing correction based on parameters (for example, the engine coolant temperature) other than the rotation increase amount $\Delta\omega$.

In following S25, injection quantities $\Delta Q1$ to $\Delta Q4$ of the fuel injected through the small injections are calculated for the respective cylinders based on the fluctuation of the inlet pressure P sensed in S23. For example, the change of the injection rate R shown in part (b) of FIG. 8 is estimated from the fluctuation of the inlet pressure P shown in part (c) of FIG. 8. Then, a shaded area in part (b) of FIG. 8 out of the estimated injection rate change is calculated as the injection quantity $\Delta Q$ (e.g., $\Delta Q1$). The change of the injection rate R can be estimated as mentioned above since there is a correlation between the fluctuation of the pressure (the inlet pressure P) sensed by the fuel pressure sensor 20a and the change of the injection rate R as explained below.

That is, the pressure P sensed by the fuel pressure sensor 20a falls at a changing point P1 after the drive current I flows through the solenoid 20b as shown in part (a) of FIG. 8 and before the injection rate R starts increasing at timing R3. This is because the control valve 23 opens the leak hole 24 and the pressure reduction processing of the oil pressure chamber Cd is performed at timing P1. Then, the pressure decrease from the changing point P1 stops once at a changing point P2 when the oil pressure chamber Cd is sufficiently depressurized.

Then, as the injection rate R starts increasing at timing R3, the sensed pressure P starts decreasing at a changing point P3. Then, as the injection rate R reaches the maximum injection rate at timing R4, the decrease of the sensed pressure P stops at a changing point P4. A decrease amount from the changing point P3 to the changing point P4 is larger than a decrease amount from the changing point P1 to the changing point P2.

Then, as the injection rate R starts decreasing at the timing R4, the sensed pressure P starts increasing at the changing point P4. Then, as the injection rate R becomes zero and the actual injection ends at timing R5, the increase of the sensed pressure P stops at a changing point P5. The sensed pressure P after the changing point P5 attenuates while repeating decrease and increase in a fixed cycle (not shown).

Thus, the increase start timing R3 (the injection start timing) and the decrease end timing R5 (the injection end timing) of the injection rate R can be estimated by detecting the changing points P3 and P5 in the fluctuation of the sensed pressure P sensed by the fuel pressure sensor 20a. Moreover, the change of the injection rate R can be estimated from the fluctuation of the sensed pressure P based on the correlation between the fluctuation of the sensed pressure P and the change of the injection rate R explained below.

That is, there is a correlation between a pressure decrease rate $P\alpha$ from the changing point P3 to the changing point P4 of the sensed pressure P and an injection rate increase rate $R\alpha$ from the changing point R3 to the changing point R4 of the injection rate R. There is a correlation between a pressure increase rate $P\beta$ from the changing point P4 to the changing point P5 and an injection rate decrease rate $R\beta$ from the changing point R4 to the changing point R5. There is a correlation between a pressure decrease amount $P\gamma$ from the changing point P3 to the changing point P4 and an injection rate increase amount $R\gamma$ from the changing point R3 to the changing point R4. Accordingly, the injection rate increase rate $R\alpha$, the injection rate decrease rate $R\beta$, and the injection rate increase amount $R\gamma$ of the injection rate R can be estimated by sensing the pressure decrease rate $P\alpha$, the pressure increase rate $P\beta$, and the pressure decrease amount $P\gamma$ from the fluctuation of the sensed pressure P sensed by the fuel pressure sensor 20a. As described above, the various states R3, R5, $R\alpha$, $R\beta$, and $R\gamma$ of the injection rate R can be estimated, and eventually, the actual injection quantity $\Delta Q1$ as the area of the shaded portion shown in part (b) of FIG. 8 can be calculated.

In following S26, it is determined whether processing of S21 to S25 has been performed for all the cylinders #1 to #4. When it is determined that the processing of S21 to S25 has been completed for all the cylinders (S26, YES), the process proceeds to following S27. When it is determined that the processing has not been completed yet (S26: NO), the processing of FIG. 6 is ended once.

Figure 9:
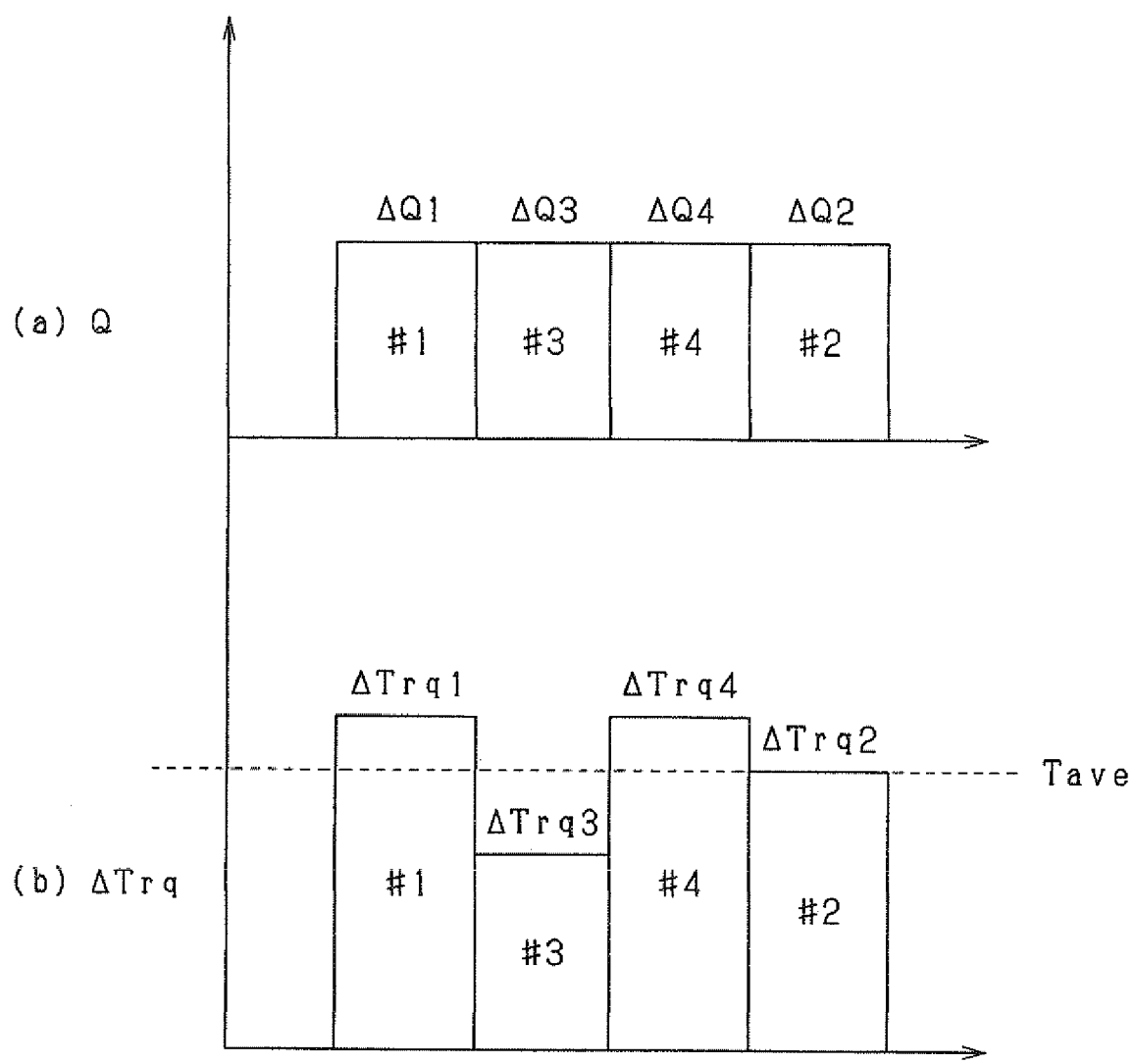
FIG. 9 is a diagram showing an injection quantity variation and a torque increase amount variation obtained through the processing of FIG. 6 according to the embodiment.

Part (a) of FIG. 9 shows the injection quantities ΔQ1, ΔQ3, ΔQ4 and ΔQ2 of the respective cylinders calculated in S25 in the order of the small injections performed in S21. Part (b) of FIG. 9 shows the torque increase amounts ΔTrq1, ΔTrq3, ΔTrq4 and ΔTrq2 of the respective cylinders calculated in S24 in the order of the small injections performed in S21. In the present embodiment, the small injections in S21 are performed to equalize the injection quantities among all the cylinders. Therefore, as shown in part (a) of FIG. 9, the injection quantity variation is not caused and the injection quantities are equalized. Therefore, the variation in the torque increase amount among the cylinders shown in part (b) of FIG. 9 (i.e., the torque increase amount variation) is free from influence of the injection quantity variation and can be specified as the variation caused by the difference in the characteristics of the respective cylinders. Therefore, the torque increase amount variation can be calculated as the cylinder characteristic variation.

The small injection in S21 is performed in a state where the EGR quantity is brought to zero by fully closing the EGR valve 52a when the small injections are performed in all the cylinders. Therefore, the variation in the torque increase amount (the torque increase amount variation) among the cylinders shown in part (b) of FIG. 9 is free from influence of the distribution variation of the recirculated exhaust gas (shown by the solid line L1 in FIG. 5). It can be determined that the element of the distribution variation of the recirculated exhaust gas is eliminated from the cylinder characteristic variation calculated as described above.

Therefore, in S27 (a cylinder characteristic variation calculating section), the cylinder characteristic variation is calculated based on the actual output torque increase amounts ΔTrq1 to ΔTrq4 calculated in S24. The calculation result in S27 is treated as a calculation result, from which the distribution variation element of the recirculated exhaust gas is eliminated.

More specifically, an average value Tave of the torque increase amounts ΔTrq1 to ΔTrq4 of the respective cylinders is calculated as a reference value. Then, variation amounts as deviations of the respective torque increase amounts ΔTrq1 to ΔTrq4 from the average value Tave are calculated as variation amounts of the respective torque increase amounts ΔTrq1 to ΔTrq4. For example, the variation amount of the first cylinder #1 is ΔTrq1 minus Tave. The variation amounts calculated for the respective cylinders are expressed as characteristic values of the respective cylinders. When the variation amount (the characteristic value) is plus, it is determined that the characteristic of the corresponding cylinder (the cylinders #1 and #4 in the example shown in part (b) of FIG. 9) is a characteristic with ignitability better than the reference characteristic. When the variation amount (the characteristic value) is minus, it is determined that the characteristic of the corresponding cylinder (the cylinder #3 in the example shown in part (b) of FIG. 9) is a characteristic with the ignitability worse than the reference characteristic.

When the small injection is performed in a state where the injection quantities of the respective cylinders are equalized as in the present embodiment, the processing of S23 and S25 may be omitted. However, in this case, it is required to perform learning (referred to as injection quantity learning, hereinafter) for calculating the actual injection quantity with respect to the injection command value set in S12 of FIG. 3 based on the sensed pressure P of the fuel pressure sensor 20a shown in FIG. 8 and for changing and storing data of the injection control map M based on a deviation of the calculated actual injection quantity from the command injection quantity commanded with the injection command value. It is because it can be guaranteed that the injection quantities of the respective cylinders are equalized by performing the injection quantity learning.

That is, if the injection quantity learning is performed, the variation in the injection quantity among the cylinders (the injection quantity variation) caused by the individual differences and the aging degradation of the injectors 20 and the like will be smoothed. It is preferable to change the injection pattern (the number of injection stages, injection timing and injection quantity of each of the injections, and the like) of the data in the map M (for example, data D1 shown in FIG. 4) corresponding to the various conditions as of the injection (for example, the engine rotation speed NE, the injection quantity Q, the number (#1 to #4) of the injector 20 and environmental conditions such as the engine coolant temperature) to achieve desired output torque and emission state when the injection quantity learning is performed.

In following S28 (a correcting section, a learning section), learning is performed by changing and storing the data (the injection pattern) stored in the injection control map M described above and shown in FIG. 4 based on the cylinder characteristic variation calculated in S27. More specifically, the injection pattern (the number of injection stages, injection timing and injection quantity of each of the injections, and the like) of the data in the map M corresponding to the various conditions as of the small injection (for example, the engine rotation speed NE, the small injection quantity ΔQ, the number (#1 to #4) of the injector 20 and environmental conditions such as the engine coolant temperature) is changed to achieve desired output torque and emission state.

In the case of the torque variation (the cylinder characteristic variation) shown in part (b) of FIG. 9, it is determined that the characteristic of each of the cylinders #1 and #4 is a characteristic with good ignitability. Therefore, in this case, all of the data in the map M corresponding to the cylinders #1 and #4 should be preferably changed to inhibit the combustion and learned. For example, the data may be changed to delay the injection start timing of the pilot injection or the main injection.

It is determined that the characteristic of the cylinder #3 is a characteristic with bad ignitability. Therefore, in this case, all of the data in the map M corresponding to the cylinder #3 should be preferably changed to promote the combustion and learned. For example, the data may be changed to advance the injection start timing of the pilot injection or the main injection. The variation amount of the second cylinder #2 with respect to the average value Tave is zero. Accordingly, the change in S28 is not performed in the map M corresponding to the cylinder #2.

The present embodiment described above exerts following effects.

(1) The output torque is increased by the small injection, and the torque increase amounts ΔTrq1 to ΔTrq4 and the small injection quantities ΔQ1 to ΔQ4 at that time are sensed (in S24 and S25). The small injection is performed so that the injection quantities of all the cylinders are the same (in S21). Therefore, it can be determined that the variation in the torque increase amount among the cylinders shown in part (b) of FIG. 9 is not caused by the injection quantity variation but is caused by the difference in the characteristics of the respective cylinders. Therefore, the torque increase amount variation is calculated as the cylinder characteristic variation (in S27). The data of the injection control map M is learned in accordance with the cylinder characteristic variation (the variation amount) calculated in this way. Accordingly, the fuel injection control can be performed with high accuracy to achieve the desired output torque and emission state.

(2) When the small injection is performed in S21, the small injections in the respective cylinders are performed in succession during the same deceleration period. Accordingly, the torque increase amount variation (the cylinder characteristic variation) can be calculated in a state where the various conditions such as the fuel temperature as of the small injection are equalized among all the cylinders. As a result, the cylinder characteristic variation can be obtained with high accuracy.

(3) Even if the opening degree setting of the EGR valve 52a or the throttle valve 51a is to be changed in accordance with the cylinder characteristic variation calculated in S27, the change (the learning) corresponding to the characteristic of each cylinder cannot be performed because the recirculated exhaust gas quantity and the fresh air quantity are distributed to the respective cylinders #1 to #4 by the intake manifold 51m. As contrasted thereto, in the present embodiment, the injection start timing is changed and learned in accordance with the cylinder characteristic variation calculated in S27. Therefore, the map for each cylinder can be changed and learned in accordance with the characteristic of each cylinder.

(4) The average value Tave of the torque increase amounts $\Delta Trq1$ to $\Delta Trq4$ of the respective cylinders (i.e., the average value of the cylinder characteristics of the respective cylinders) is calculated as the reference value. The variation amounts as the deviations of the torque increase amounts $\Delta Trq1$ to $\Delta Trq4$ from the average value Tave are calculated as the characteristic values of the respective cylinders. Therefore, it is unnecessary to set the reference value by adaptation or the like, thereby reducing the calculation processing burden of the cylinder characteristic variation.

(5) The small injection in S21 is performed in a state where the EGR quantity is brought to zero by fully closing the EGR valve 52a while the small injections are performed in all the cylinders. Therefore, it can be determined that the element of the distribution variation of the recirculated exhaust gas is eliminated from the cylinder characteristic variation calculated in S27.

(6) The fuel pressure sensor 20a is arranged to be closer to the injection holes 20f than the common rail 12. Accordingly, the fuel pressure fluctuation caused in connection with the small injection from the injection holes 20f can be sensed with high accuracy. Therefore, the change of the injection rate can be calculated with high accuracy from the sensed fuel pressure fluctuation and eventually the actual injection quantities $\Delta Q1$ to $\Delta Q4$ of the small injections can be calculated with high accuracy. Therefore, it can be realized with high accuracy to change the data of the map M to the optimum values in accordance with the cylinder characteristic variation.

According to the present embodiment, the fuel pressure sensor 20a is fixed to the injector 20. Therefore, the fixation position of the fuel pressure sensor 20a is closer to the injection holes 20f than in the case where the fuel pressure sensor 20a is fixed to the high-pressure pipe 14 connecting the common rail 12 with the injector 20. Accordingly, the pressure fluctuation in the injection holes 20f can be sensed more appropriately than in the case where the pressure fluctuation is sensed after the pressure fluctuation in the injection holes 20f attenuates in the high-pressure pipe 14.

The above described embodiment may be modified and implemented as follows, for example. The present invention is not limited to the above-described embodiment. Characteristic constructions of the embodiment may be combined arbitrarily.

In the above-described embodiment, the small injection control in S21 of FIG. 6 is performed during the no-injection running. That is, in S20, a condition that the no-injection running is being performed is set as the learning condition. Alternatively, the condition that the no-injection running is being performed may be abolished and the small injection control in S21 may be performed during the injection running.

In this case, a small quantity beforehand set regardless of the accelerator operation amount ACCP is added to the injection quantity calculated based on the accelerator operation amount ACCP of the driver, the engine rotation speed NE and the like, and the fuel of the quantity increased by the small quantity in this way is injected in S21. In S22, an increase amount from the engine rotation speed corresponding to the injection quantity before the increase to the engine rotation speed corresponding to the injection quantity after the increase is sensed. The processing from S23 may be performed by regarding the thus-sensed increase amount of the rotation speed as the rotation increase amount $\Delta\omega$ (refer to part (b) of FIG. 7) accompanying the small injection.

In the above-described embodiment, the injection start timing is changed and learned in accordance with the cylinder characteristic variation. Alternatively, in addition to or in place of the injection start timing, the injection mode such as the injection quantity or the injection stage number in the case of the multi-stage injection may be changed and learned, for example.

In the above-described embodiment, the data of the map M of FIG. 4 is changed using the cylinder characteristic variation calculated by the processing of FIG. 6 as it is. Alternatively, multiple times of the small injections may be performed in a state where the conditions such as the engine rotation speed NE are equalized, and integration average of cylinder characteristic variations calculated for the respective small injections may be performed. Then, the data of the map M of FIG. 4 may be changed using the cylinder characteristic variation obtained through the integration average. With such the construction, influence of the sensing error concerning the torque increase amount sensing in S22 and the injection quantity sensing in S23 can be reduced as compared with the case where the data of the map M is changed by using the calculation result of the cylinder characteristic variation obtained by a single time of the fuel injection in each cylinder as it is. As a result, the map M less affected by the sensing error can be obtained.

In the above-described embodiment, the small injection quantities of the respective cylinders are equalized when performing the small injection in S21. Thus, the cylinder characteristic variation is calculated based on the torque increase amount variation in a state where the injection quantity variation is brought to zero. Alternatively, the processing of FIG. 6 may be performed without equalizing the small injection quantities. In this case, the values of the injection quantities $\Delta Q1$ to $\Delta Q4$ of the respective cylinders vary unlike part (a) of FIG. 9. However, the cylinder characteristic variation can be calculated based on the injection quantity variation and the torque increase amount variation shown in part (b) of FIG. 9.

For example, a ratio of the torque increase amount $\Delta Trq1$ to the injection quantity $\Delta Q1$ may be calculated as a cylinder characteristic value for each cylinder, and a variation of the calculated cylinder characteristic value among the cylinders may be calculated as the cylinder characteristic variation. Alternatively, a torque increase amount converted from the injection quantity $\Delta Q1$ may be calculated, and a deviation of the converted torque increase amount from the torque increase amount $\Delta Trq1$ calculated in S24 may be calculated as a cylinder characteristic value for each cylinder. A variation in the calculated cylinder characteristic value among the cylinders may be calculated as the cylinder characteristic variation.

In order to fix the fuel pressure sensor 20a to the injector 20, in the above-described embodiment, the fuel pressure sensor 20a is fixed to the fuel inlet 22 of the injector 20. Alternatively, as shown by a chained line 200a in FIG. 2, a pressure sensor 200a may be mounted inside the housing 20e to sense fuel pressure in an internal fuel passage 25 extending from the fuel inlet 22 to the injection holes 20f.

The fixing structure of the fuel pressure sensor 20a can be simplified in the case where the fuel pressure sensor 20a is fixed to the fuel inlet 22 as described above as compared with the case where the fuel pressure sensor 200a is mounted inside the housing 20e. When the fuel pressure sensor 200a is mounted inside the housing 20e, the fixing position of the fuel pressure sensor 200a is closer to the injection holes 20f than in the case where the fuel pressure sensor 20a is fixed to the fuel inlet 22. Therefore, the pressure fluctuation in the injection holes 20f can be sensed more appropriately.

The fuel pressure sensor 20a may be fixed to the high-pressure pipe 14. In this case, it is preferable to fix the fuel pressure sensor 20a to a position distanced from the common rail 12 by a predetermined distance.

A flow rate restricting section may be provided between the common rail 12 and the high-pressure pipe 14 for restricting a flow rate of the fuel flowing from the common rail 12 to the high-pressure pipe 14. The flow rate restricting section functions to block the flow passage when an excess fuel outflow is caused by fuel leakage due to a damage to the high-pressure pipe 14, the injector 20 or the like. For example, the flow rate restricting section may be constituted of a valve member such as a ball that blocks the flow passage when the excess flow rate occurs. Alternatively, a flow damper constituted by integrally combining the orifice 12a (the fuel pulsation reducing section) and the flow rate restricting section may be adopted.

In place of the construction of arranging the fuel pressure sensor 20a downstream of the orifice and the flow rate restricting section with respect to the fuel flow direction, the fuel pressure sensor 20a may be arranged downstream of at least one of the orifice and the flow rate restricting section.

An arbitrary number of the fuel pressure sensor(s) 20a may be used. For example, two or more sensors 20a may be provided to the fuel flow passage of one cylinder. A rail pressure sensor for sensing the pressure in the common rail 12 may be provided in addition to the above-described fuel pressure sensor 20a.

In place of the electromagnetic drive injector 20 shown in FIG. 2, a piezo drive injector may be used. Alternatively, an injector that does not cause pressure leak from the leak hole 24 and the like such as a direct acting injector that transmits the drive power not through the oil pressure chamber Cd (for example, a direct acting piezo injector having been developed in recent years) can be also used. In the case where the direct acting injector is used, control of the injection rate is facilitated.

The kind and the system configuration of the engine as the control target can also be arbitrarily modified in accordance with the use and the like. In the above-described embodiment, the present invention is applied to the diesel engine as an example. For example, the present invention can be also applied to a spark ignition gasoline engine (specifically, a direct-injection engine) or the like basically in the similar way. For example, a fuel injection system of a direct injection gasoline engine generally has a delivery pipe that stores fuel (gasoline) in a high-pressure state. In the system, the fuel is pumped from a fuel pump to the delivery pipe, and the high-pressure fuel in the delivery pipe is distributed to multiple injectors 20 and injected and supplied into engine combustion chambers. In this system, the delivery pipe corresponds to the pressure accumulator. The device and the system according to the present invention can be applied not only to the injector that injects the fuel directly into the cylinder but also to an injector that injects the fuel to an intake passage or an exhaust passage of the engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A cylinder characteristic variation sensing device applied to a multi-cylinder internal combustion engine having a plurality of cylinders and a plurality of injectors respectively provided to the cylinders, the cylinder characteristic variation sensing device comprising:

a small injection controlling means for performing small injections sequentially in the respective cylinders, thereby injecting a small quantity of fuel from each injector regardless of manipulation performed by a driver to operate the internal combustion engine;

a torque increase amount sensing means for sensing an increase amount of output torque caused in connection with the small injection or a physical quantity relevant to the increase amount for each cylinder;

an injection quantity sensing means for sensing an actual injection quantity of the small injection or a physical quantity relevant to the injection quantity for each cylinder; and a cylinder characteristic variation calculating means for calculating a variation in a cylinder characteristic among the cylinders based on a variation in the sensing value of the injection quantity sensing means among the cylinders and a variation in the sensing value of the torque increase amount sensing means among the cylinders.

2. The cylinder characteristic variation sensing device as in claim 1, wherein the small injection controlling means performs the small injection in a state where the injection quantities of the respective cylinders are equalized so that the sensing values of the injection quantity sensing means coincide with each other among all the cylinders, and the cylinder characteristic variation calculating means calculates the variation in the cylinder characteristic among the cylinders while bringing the variation in the sensing value of the injection quantity sensing means among the cylinders to zero.

3. The cylinder characteristic variation sensing device as in claim 1, wherein the internal combustion engine has an exhaust gas recirculation valve for regulating an exhaust gas recirculation quantity recirculated from an exhaust system to an intake system, and the small injection controlling means performs the small injection in a state where the exhaust gas recirculation valve is fully closed.

4. The cylinder characteristic variation sensing device as in claim 1, wherein the small injection controlling means performs the small injection during a deceleration period of a vehicle, in which the internal combustion engine is mounted, and the small injection controlling means performs the small injections sequentially in the respective cylinders at a predetermined interval or at predetermined intervals during the same deceleration period.

5. The cylinder characteristic variation sensing device as in claim 1, further comprising:

a correcting means for setting a reference characteristic for the cylinder characteristics of all the cylinders and for correcting fuel injection start timing of the cylinder in accordance with a variation amount of the cylinder characteristic of the same cylinder with respect to the reference characteristic.

6. The cylinder characteristic variation sensing device as in claim 5, wherein an average value of the cylinder characteristics of all the cylinders is set as the reference characteristic.

7. The cylinder characteristic variation sensing device as in claim 1, further comprising:

a learning means for setting a reference characteristic for the cylinder characteristics of all the cylinders and for storing and learning a variation amount of the cylinder characteristic with respect to the reference characteristic for each cylinder.

8. The cylinder characteristic variation sensing device as in claim 7, wherein an average value of the cylinder characteristics of all the cylinders is set as the reference characteristic.

9. The cylinder characteristic variation sensing device as in claim 1, wherein the internal combustion engine is structured to distribute and supply the fuel from a pressure accumulator, which accumulates the fuel, to the injector, and the injection quantity sensing means is a fuel pressure sensor for sensing pressure of the fuel supplied to the injector as the physical quantity and is arranged in a fuel passage, which extends from the pressure accumulator to an injection hole of the injector, at a position closer to the injection hole than the pressure accumulator.

10. The cylinder characteristic variation sensing device as in claim 9, wherein the fuel pressure sensor is fixed to the injector.

11. The cylinder characteristic variation sensing device as in claim 10, wherein the fuel pressure sensor is fixed to a fuel inlet of the injector.

12. The cylinder characteristic variation sensing device as in claim 10, wherein the fuel pressure sensor is mounted inside the injector to sense fuel pressure in an internal fuel passage extending from a fuel inlet of the injector to the injection hole of the injector.

13. The cylinder characteristic variation sensing device as in claim 9, wherein an orifice is provided in a fuel passage, which extends from the pressure accumulator to a fuel inlet of the injector, for attenuating a pressure pulsation of the fuel in the pressure accumulator, and the fuel pressure sensor is arranged downstream of the orifice with respect to a fuel flow direction.

14. The cylinder characteristic variation sensing device as in claim 1, wherein the torque increase amount sensing means is a rotation speed sensor for sensing rotation speed of an output shaft of the internal combustion engine as the physical quantity.

\* \* \* \* \*